March 25, 1969
W. L. ASHBY
3,435,345
SYSTEM FOR DETECTING COHERENT ENERGY
IN THE PRESENCE OF SATURATING NOISE
Filed June 24, 1965
Sheet 1 of 2
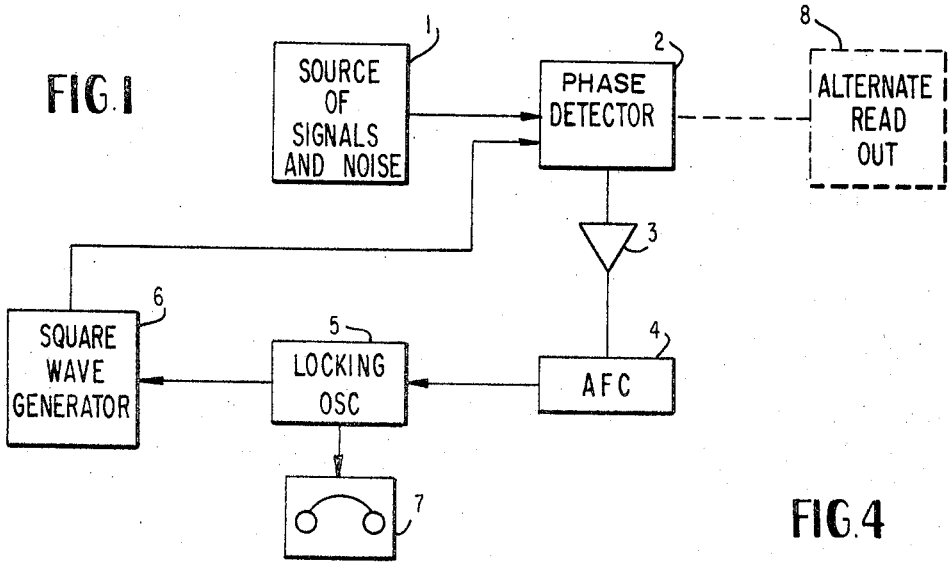
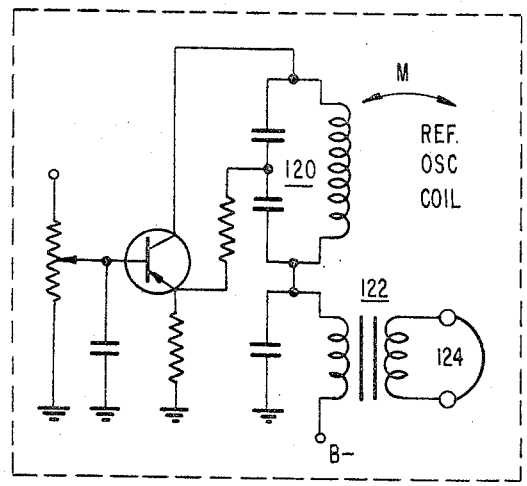
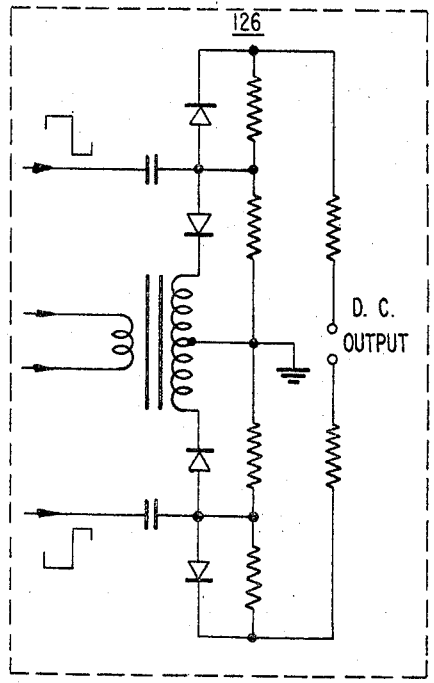
INVENTOR
WILLIS L. ASHBY
BY
ATTORNEYS

INVENTOR
WILLIS L. ASHBY

ATTORNEYS

United States Patent Office 3,435,345
Patented Mar. 25, 1969

3,435,345
SYSTEM FOR DETECTING COHERENT ENERGY
IN THE PRESENCE OF SATURATING NOISE
Willis L. Ashby, Box 97, Pluckemin, N.J. 07978
Filed June 24, 1965, Ser. No. 466,666
Int. Cl. H04b 1/10, 1/16; H03d 13/00
U.S. Cl. 325—423                    7 Claims

ABSTRACT OF THE DISCLOSURE

In a system for detecting the presence of coherent energy when it is buried within saturating noise, a source of coherent energy is coupled to an input of a phase detector circuit, and a reference oscillator driven over the entire frequency range of system is connected to the output of the phase detector circuit. The output of the reference oscillator is connected to another input of the phase detector so that given the presence of coherent energy the reference oscillator will correlate with the coherent energy to indicate the presence of such energy.

---

This invention relates to a system for detecting the presence of coherent energy in the presence of saturating noise. In particular, this system will detect the presence of any signal of any frequency within a band of frequencies where the entire band is covered by saturating noise. This system does not require that the signal-to-noise ratio be greater than or equal to unity; in fact, this system is able to operate when the signal-to-noise ratio is far less than unity.

Signal receivers exist which include means to detect signals in the presence of noise. These receivers have generally been deficient in that they have required a signal-to-noise ratio greater than unity at some point during the operation of the receiver. Under such circumstances, a detecting unit then can be made to follow this signal once the receiver is locked onto it as the signal-to-noise ratio degenerates to something less than unity. Other prior systems are of the closed loop type where the receiver is already tuned to a predetermined frequency, thus all that need be done with such a receiver is to detect the presence or absence of a signal at the predetermined frequency and it is not required to search out a signal from a band of frequencies.

The present invention obviates the difficulties of the prior art systems in that it is capable of scanning a band of frequencies and detecting the presence of a signal even though the signal is buried in noise. Briefly stated, the system makes use of the fact that noise is completely random in nature. Thus, if random noise is fed to a linear phase detector, it will at some instant be either directly in phase with the detector or 180° out of phase with the detector. Random noise, therefore, can be made to produce a DC pulse output. This output if registered on a micro-ammeter of the zero center type will cause the meter to fluctuate about the zero point over a period of time.

The present invention utilizes these output pulses, produced by the noise from the detector, as a AFC feedback with the requirement that the AFC loop have very low time constants for the purpose of sweeping a reference oscillator at a rapid rate over a frequency band. The reference oscillator can be made to control a square wave generator in order to produce reference signals which can be applied to the phase detector.

The reference oscillator will essentially stay at its natural resonant frequency, averaged over a finite length of time, during the reception of random noise. When a signal having coherent energy is present in the pass-band of the system, the output of the phase detector will become DC and thus, register or can be registered as an indication of the presence of a signal. The direct current is also passed through the low time constant AFC loop and will shift the reference oscillator into a desired relationship so as to increase the direct current output of the balance detector. Noise pulses having energy greater than that of the coherent signal will pull the reference oscillator out of phase proximity but in that their nature is transient, the resultant output from the phase detector due to noise will tend to cancel out, thus allowing an averaging indication when a signal is received.

The system embodied by this invention is essentially a product detector making use of the fact that noise is occasionally in phase or, that is, has phase relationship, and can be used to detect the presence of coherent energy.

Accordingly, one of the main objects of the present invention is to provide a signal detecting system having the ability to detect a signal of unknown frequency when the energy content of the signal is much less than the energy level of the noise.

It is a further object of this invention to provide a novel, automatic-frequency-control circuit (AFC) to detect the presence of coherent energy when that enrgy is obscured in saturating noise energy.

It is a further object of this invention to provide a novel AFC circuit which is capable of sweeping an oscillator over a band of frequencies and which will register a coherent signal, when received, as a series of pulses that are easily integrated in the presence of noise output.

The above-mentioned and other objects of this invention and the manner of obtaining them will become more apparent and the invention itself will be best understood by reference to the following description of an embodiment of the invention taken in conjunctiton with the accompanying drawings, wherein:

FIGURE 1 is a block diagram illustrating the coherent energy detection system embodied by this invention;

FIGURE 3 is a schematic illustration of an alternative read-out system to be used with the circuit represented by FIGURE 2; and FIGURE 4 is a schematic diagram of an alternative circuit arrangement that may be used in FIGURE 2.

Figure 2:
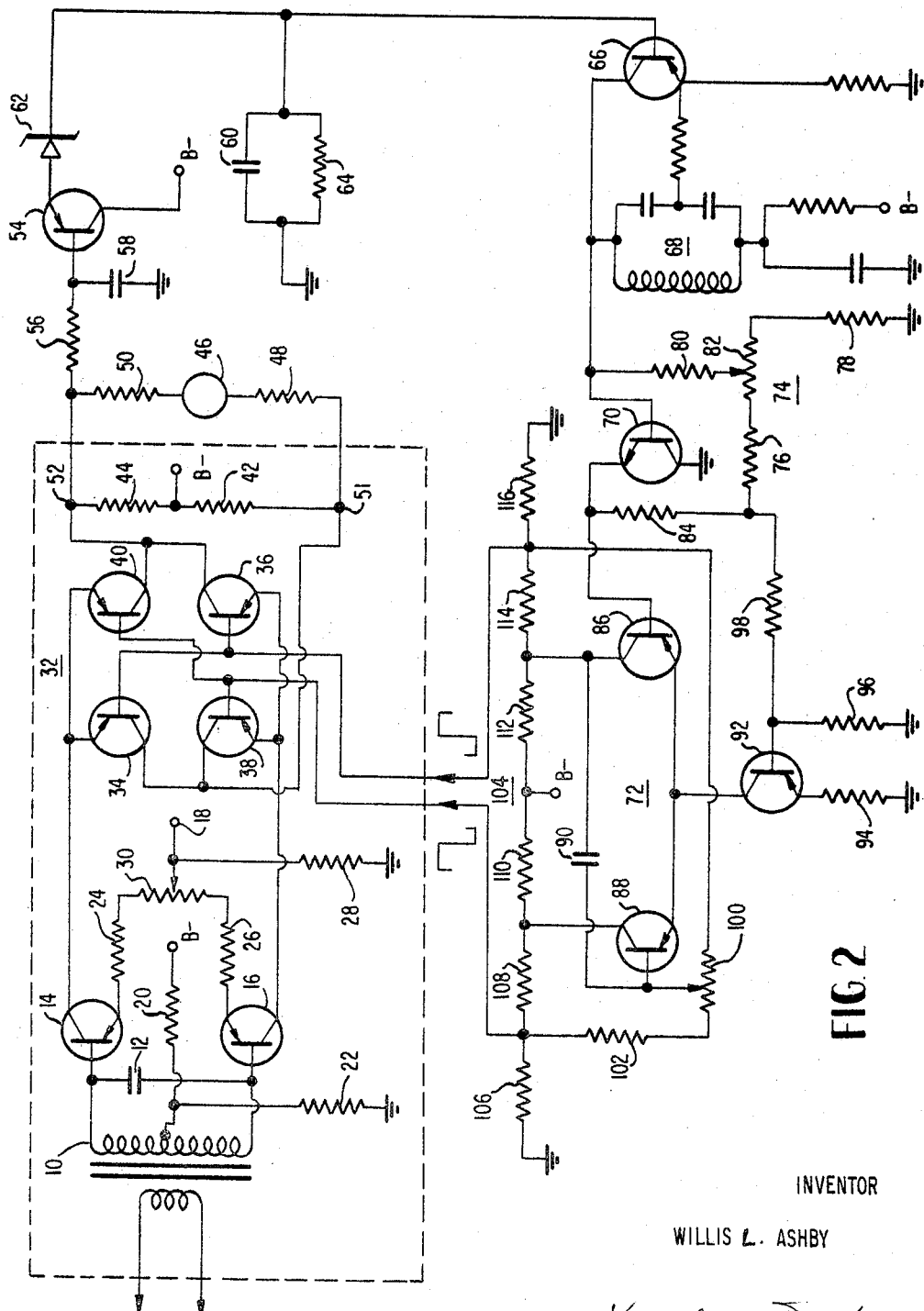
FIGURE 2 is a schematic wiring diagram illustrating one electric embodiment of the invention illustrated in FIGURE 1.

Referring now to the block diagram of FIGURE 1, an incoming signal combined with saturating noise is fed from a source 1 of said signals which may be the undetected linear output of the IF stages of a radio or radar receiver. This combination of signals is impressed upon the input of a linear balanced phase detector 2. The phase detector may be of any of several commonly known types and two specific embodiments of such a detector will be described in subsequent paragraphs with respect to FIGURES 2 and 4. It is sufficient for purposes of understanding the general operation of this system to state that the output of this detector will consist of either a series of random pulses of direct current in the event that the signal from source 1 is merely noise or a series of discrete D.C. pulses in the event that the signal from source 1 is a combination of an information signal and noise. The detector is provided with two output circuits. One output of the detector 2 is applied to a linear direct coupled amplifier 3 for the purposes of amplifying the detector output in order that it may be applied as AFC control to an oscillator 5.

Under ideal conditions, the amplifier 3 will pass a frequency from direct current up to one-half of the total band width of the pass band of the total system applied to the phase detector 2. It is essential to the operation of this circuit that this amplifier combination with the AFC 4 have the widest possible band pass, and yet be provided with trap or low-pass filters to prevent reference frequency feed through that would cause the AFC circuit to break into self-oscillation.

The reference oscillator 5 is controlled by the AFC 4. If the output applied from the AFC 4 to the locking oscillator is stable direct current, then the locking oscillator will oscillate at a stable frequency voltage proportional to its natural resonate frequency. If, on the other hand, the output applied from the AFC 4 is such that it is varying in amplitude, then the control applied to the reference oscillator is moving and therefore, the output frequency of the oscillator will also move proportionately.

The oscillator 5 is shown in FIGURE 1 as having its output applied to a square wave generator 6, the output of which is applied as a reference frequency to the linear phase detector 2. Thus, during the period when the oscillator is affected by a noise pulse, the detector will provide an output because of some finite phase relation at that instant between the noise pulse and the oscillator. However, the noise pulse will either change frequency or die out in amplitude thus reducing the AFC to the lowest threshold minimum and the circuit will then look for the next best pulse. The result of this operation is that the D.C. output from the detector will fluctuate about a zero point.

When the source 1 presents a combination of signal plus noise to the detector 2, then the system will react in either of two ways, depending on the energy level of the received signal compared to the energy level of the received and/or generated noise.

When the energy level of the received signal is lower than that of the noise pulses in the detector, then the system will act as heretofore described except that as the AFC 4, which is controlled by the noise pulses, causes the reference oscillator 5 to scan over the frequency band, the reference oscillator will register on the incoming coherent signal. Since the signal will remain constant as opposed to changing in frequency or dying out in amplitude, the oscillator will scan in a random manner back and forth over the band and each time it passes the signal, it will register a hit, i.e., the oscillator will interrupt its sweep for a finite period of time at every cross or concurrence with signal frequency and thus will cause the detector to maintain a D.C. output different from that of when the detector is only producing an output due to noise.

The thus detected signal may be read out through the utilization of various kinds of signal-indicating circuits. Two specific embodiments are shown in block form in FIGURE 1. An audible read-out circuit 7 may be used in conjunction with the reference oscillator whereby an operator may actually hear the hits as the reference oscillator passes over them. In the alternative the signal may be read out through the use of a zero center microammeter 8. In the event that the latter read-out means is used, then the operator would see a fluctuation of the needle on one side of the zero center, this of course being different from that that would be read out with pure noise where the operator would have seen the needle fluctuating positive and negative around the zero point.

In the event that the signal energy is greater than that of the noise energy, the system will act as a conventional phase lock system whereby the reference oscillator will lock onto the received signal.

The circuit shown in FIGURE 2 represents a specific embodiment of the invention as it is employed in a radio receiver. A source of undetected noise in combination with signal can be supplied to this detection system from the linear IF circuits. As shown, the combined noise and signal energy is transformer coupled to a tuned circuit consisting of the transformer secondary 10 and a capacitor 12. The received energy is fed to the bases of a split phase inverter consisting of the transistors 14 and 16 and their associated bias circuits.

It was found useful to include a test point 18 in the emitter circuit of the phase inverters 14 and 16 in order that a high gain scope may be connected between the test point 18 and ground for the purpose of providing a check on overloading of the balanced phase detector. Any evidence of a signal at this point would indicate a severe overload of the balanced modulator requiring the reduction of the IF–RF gain of the receiver.

Resistors 20 and 22 in the base circuit of the phase inverters 14 and 16 are the usual bias resistors for these two transistors. Likewise, the resistors 24, 26, 28 and the potentiometer 30 provide a voltage divider in order to insure proper emitted bias for the transistors 14 and 16.

The collectors of the transistors 14 and 16 are connected to the emitters of four transistors which comprise a phase detector 32. The output impedances of the balanced drivers 14 and 16 match the input emitter impedance of the doubly balanced phase detector 32.

The detector 32 must, necessarily, be linear to both reference and signal inputs so that the output of this detector may be a true measure of phase between a known reference signal and an unknown signal, where the latter, of course, would be either the signal or noise inputs. The known signal is the heretofore mentioned square wave referred to with reference to FIGURE 1 and which will be described in detail subsequently.

The phase detector comprises four transistors 34, 36, 38 and 40 of a like kind. The bases of the transistors 34 and 36 and the bases of the transistors 38 and 40, respectively, are connected together. The transistors 34 and 40 and likewise the transistors 38 and 36 have common emitter circuits. Thus, through the use of the phase inverters 14 and 16, the signals applied to the emitters of transistors 34 and 40 will be in phase and the signals applied to the emitters of transistors 38 and 36 of the phase detector will likewise be in phase; however, the latter signals will be 180° out of phase with those signals applied to transistors 34 and 40. The collectors of transistors 34 and 38 are connected together and the collectors of transistors 36 and 40 are connected together.

The transistors of the detector 32 are normally biased to the off condition, and they are turned on by the application of a square wave to their bases. This square wave is the heretofore mentioned reference signal. It consists of a pair of signals 180° out of phase with each other where one of said signals is applied to the commonly connected bases of transistors 34 and 36 and the other to the common bases of transistors 38 and 40.

Assuming a signal of a particular phase arriving at the emitter of transistor 34 as being in phase with the reference signal applied to the base of this transistor, then this transistor will be in its on state and will amplify in a linear manner. At the same time, the opposite phase of the same signal will be arriving at the emitter of transistor 36 and will be 180° out of phase with the reference signal on the base of this transistor thus decreasing the amount of current flow through this transistor. Likewise, the signal on the emitter of transistor 38 will then be in phase with the reference signal placed on the base of this transistor, therefore, this transistor will be turned on and will be conducting and amplifying in a linear manner to increase the current outflow of the transistor. In a like manner, the signal applied to the emitter of transistor 40 will be out of phase with the reference signal on the base of transistor 40 and, therefore, current flow through it will decrease.

Since the collectors of transistors 34 and 38 are tied together and since the current flow through these two transistors has increased in that both have been turned on then the current flow through the resistor 42 will increase causing the voltage drop across the resistor to increase. The potential at the junction 51 which is common to transistors 34 and 38 and the voltage dropping resistor 42 will increase in the positive direction. Likewise, the current flow through the resistor 44 connected to the common collectors of transistors 40 and 36 at the junction point 52 will decrease thus decreasing the drop across this resistor and the voltage at the junction 52 will decrease. Since the resistors 42 and 44 are connected in series, the two voltage drops will be series additive and will be positive in the direction of the junction 51. The voltage difference thus created across the resistors 42 and 44 can be used as a source of current flow and is registerable on a micro-ammeter 46 in a current loop established by the resistors 44, 42, 48, 50 and the micro-ammeter 46.

In a like manner, the voltage at the junction 52 would have increased had the signal arriving on the emitter of transistor 34 been out of phase with the reference signal applied to the base of the transistors 34. The transistor 34 would then have decreased its current flow and the current flow at the output of transistors 34 and 38 would have decreased whereas assuming that signal had been in phase with the reference signal applied to the base of transistor 40, then the output at the collectors of transistors 40 and 36 would have increased, thus presenting a voltage drop in the opposite direction across the resistors 44 and 42 and therefore causing current flow through the micro-ammeter 46 to have been in the opposite direction than that previously described.

Since noise is completely random in nature (by definition), noise pulses will cause a current reading on the micro-ammeter which will be either to the right or left of zero in that the junctions 51 and 52 will be swinging positive and negative relative to each other in a completely random manner. The indicator on the micro-ammeter 46 will thus fluctuate about its zero point. On the other hand, if a signal is present on the emitters of the phase detector, the signal will register either as a shift of average meter indication to the right or the left of zero if the signal-to-noise ratio is less than unity, or it will register as a steady D.C. output if the signal-to-noise ratio is greater than unity.

In order to improve the definition between the outputs from noise and those from the desired signal, any number of integration, correlation or zero shift circuits, well known in the art, may be used in place of the micro-ammeter at this point in the circuit.

The output of the phase detector 32 is applied to the base of amplifier 54 through a coupling resistor 56. The amplifier 54 is a wide band direct coupled amplifier and is designed to pass frequencies from D.C. up to one-half the total band width of the pass band of the total system through the phase detector 32.

It is essential to the operation of this system that the amplifier 54 and its associated circuitry which constitute part of the AFC loop utilize the shortest possible time constant without allowing the AFC circuit to break into self-oscillation.

In the present embodiment of this invention, the aforementioned requirements are met by utilizing capacitors 58 and 60 where the capacitor 58 is connected between the base of the transistor 54 and ground and the capacitor 60 is connected in parallel with a resistance 64 where the parallel combination is connected between ground and the cathode of a semiconductor breakdown device 62, the anode of the breakdown device being connected to the emitter of amplifier 54. The capacitors 58 and 60 should be of the lowest value possible in order to prevent self-oscillation of this circuit. In the present embodiment they were both chosen to be equal to one thousand picofarads. They are used for the purpose of by-passing reference frequencies to ground.

In the embodiment of this invention, illustrated in FIGURE 2, the amplifier 54 is shown connected in an emitter follower configuration. This circuit was chosen because it provides a high input impedance that tends to minimize any unbalance which might disturb the linearity of the phase detector, while still providing current gain into its low output impedance circuit consisting of the breakdown device 62, the combination of capacitor 60 and resistor 64, and the base circuits of transistor 66. In that junction transistors inherently exhibit a voltage variable capacitance effect the dynamic and static voltages applied to the base to emitter junction of transistor 66 by the Zener diode 62 and the paralleled combination of capacitor 60 and resistor 64 constitutes an efficient voltage variable frequency control of the oscillator 68 and the transistor 66. The transistor 54, breakdown device 62, transistor 66, and their associated circuits represent the amplifier 3, the AFC 4, and the reference oscillator 5 shown in FIGURE 1. It is this group that provides the reference signal to the phase detector 2 that is required for linear phase detection.

The reference oscillator used with this invention does not require synchronization or lock to the signal frequency at the input to the system and in fact, does not require any particular relationship to be established repetitively between these two. Of course, a strong signal at the input, that is to say, a signal having a signal-to-noise ratio of greater than unity will lock the reference oscillator to it; however, that is only a side effect of the system.

Assuming nothing more than noise output from the phase detector, that is to say, D.C. output from the detector produced by noise alone, then such pulses as are fed around the AFC loop will tend to cause the oscillator to be triggered at various frequencies, the mean level of which will be the natural resonant frequency of the oscillator. The actual operation of the oscillator in the AFC loop is conventional.

What is not conventional is the fact that when a signal is present in the detector, the oscillator will be made to lock up on this signal on a repetitive hit basis as the oscillator is swept by the larger energy content of the noise output over the signal. Assume a noise pulse A is superimposed on a signal B where the energy content of the noise pulse is much greater than the coherent energy content of the signal and further assume that there is a phase relationship between the two, this assumption is valid in that the nature of noise is completely random; therefore, phase proximity of noise and signal will occur at some instant of time during reception, the combination will produce a D.C. output in the detector that when amplified and applied to the oscillator, will cause the oscillator to lock up on the noise pulse and signal combination. However, the noise pulse being random will die and the oscillator will lock onto the next strongest signal which may be a noise pulse C not in phase relationship with the signal and therefore, the oscillator will be swept off of the signal. The critical and important factor of this invention is that since the signal is assumed to be either constant or constantly repetitive in the system, then there will be pulses of noise superimposed on said signal and therefore the oscillator will constantly be pinging or hitting on the combination signal. This may be read out as either a fluctuating or almost steady deflection either to the right of zero or the left of zero on the micro-ammeter 46 as opposed to the constantly fluctuating values with zero as the mean value read if noise alone is present in the system.

Of course, if the energy content of thesignal is greater than that of the noise pulses, then the D.C. signal amplified and passed as automatic frequency control will cause the oscillator 68 to lock up on the signal in which case this system acts as a conventional phase lock detector. If a steady-state D.C. output is desired under strong signal conditions, then a 90 degree phase shift of the reference oscillator may be introduced by simple circuits well known in the art.

The output of the oscillator 68 is connected to the collector of the transistor 66 and to the base of a transistor switch 70. Bias for the base of a transistor 70 is achieved by connecting the base to a voltage divider network 74 where one end of the voltage divider network is grounded through a resistor 78 and the other end of the voltage divider network is connected to the B supply through a voltage dropping resistor 76. The base of the switch 70 is connected to the voltage divider network through a voltage dropping resistor 80 which is connected to the movable arm of a potentiometer 82 where the potentiometer is connected between the voltage dropping resistors 76 and 78.

Emitter bias for the switch 70 is achieved through the use of a voltage dropping resistor 84 connected between the emitter of the switch 70 and the B supply. The collector of the switch is grounded. The emitter of the switch 70 is also connected to the base of the input transistor 86 of the multivibrator 72, thus the voltage dropping resistor 84 also acts to supply bias voltage to the base of the input transistor 86.

The multivibrator 72 is a conventional one-shot multivibrator comprising the transistors 86 and 88 where the output of the transistor 86 which is the input transistor of the multivibrator is capacitive coupled by the capacitor 90 to the base of the transistor 88. The emitters of the transistors 88 and 86 are connected together and tied to the collector of a transistor 92 where the transistor 92 acts as a squaring device for the output wave-form of the multivibrator.

The squaring transistor 92 receives it bias voltages from the voltage dropping resistors 94, 96 and 98. The voltage dropping resistor 94 is connected between the emitter and ground of transistor 92, the voltage dropping resistor 96 is connected between base and ground, and the voltage dropping resistor 98 is connected between the base and the source of B supply.

The base of the transistor 88 of the multivibrator 72 is connected to the movable arm of a potentiometer 100 where the output wave form consisting of square waves of opposite phase is taken from each end of the potentiometer 100 to be applied to the bases of transistors 38 and 40 and 34 and 36, respectively. The voltage dropping resistor 102 is used for the purpose of ensuring that the amplitude of the square wave applied to the bases of transistors 38 and 40 of the detector 32 is equal in amplitude to the wave form applied to the bases of transistors 34 and 36 of detector 32.

Biasing voltage dropping network 104 is utilized for the purpose of supplying collector potentials to the transistors 88 and 86 and also for supplying base bias to the transistor 88. The voltage dropping network comprises a series of resistors 106, 108, 110, 112, 114 and 116 where the resistors are connected in series with the opposite ends being connected to ground and the B supply is applied to the junction formed by the resistors 110 and 112. The collector potential for transistor 86 is taken from the junction of the resistors 112 and 114; likewise, the collector potential applied to the collector of transistor 88 is taken at the junction of resistors 108 and 110.

The frequency of the square wave and phase relationship of the square wave applied to the detector 32 will be dependent upon the period for which this transistor 70 is on, and this in turn will be determined by the frequency of the reference oscillator 68.

The reference oscillator is locked to the highest energy content noise pulse or signal plus noise combination in the total passband presented to the phase detector at any given instant; therefore the square wave output of the multivibrator acting as a source of reference signals for the phase detector will cause the system to follow any frequency variation of the selected energy group. However, due to the negligible coherent energy content of noise in a linear circuit, the selected energy group will die in amplitude or move out of the overall frequency pass-band presented to the phase detector, at which time the system will select the next highest energy group, sweeping the reference oscillator to the proper frequency to achieve phase stability or lock. This ability to sweep and selectively lock rapidly clearly delineates this system from prior art.

Although the above-described embodiment of this invention has utilized a micro-ammeter 46 to illustrate that conventional methods of direct or amplified output of the phase-sensitive detector may be used to indicate the presence of a desired signal and use same as a medium of information transfer if desired, in the presence of saturating noise, conventional methods of integration, correlation or zero point crossing detectors may also be employed to further enhance signal-to-noise ratios.

A second and more efficient readout system to be used with the flying noise lock is illustrated in FIGURE 3. It has been found that the oscillator-detector 120 of FIGURE 3 is capable of reading the instantaneous frequency of the reference oscillator 68. The ability to read out the instantaneous frequency of the reference oscillator is desirable in that a clear audible distinction is thereby rendered between even a very weak coherent signal energy in the phase detector passband and the practically total incoherence in noise. A detailed description of this oscillating detector will not be given as it is conventional and should be obvious to those skilled in the art.

It is sufficient to say that the resonant circuit 120 is tuned to approximately the natural resonant frequency of the reference oscillator 68 and is very loosely coupled to the same. Readout is an audio beat note through the headphones 124 and indicates the frequency of the reference oscillator at the instant the beat note is heard. In the event that only noise energy is present in the passband the reference oscillator will be swept in a totally random fashion, thus registering noise in the headphones. The presence of coherent signal energy in the passband of the phase detector will give an output from the oscillating detector, FIGURE 3, that ranges from clearly defined pings or hits of constant frequency at a minimum detectable level to steady sine-wave output from strong signals. The detection circuit of FIGURE 3 is shown solely for the purpose of illustrating system operation. It is understood that they would limit the useful passband of the total system to twice the frequency ability of human ears. Anyone schooled in the art can readily understand that use of a linear wide band frequency to analog or digital output detector would increase the system passband ability many magnitudes, if desired, and the signal-to-noise ratio enhancement due to the correlation ability of this overall system would not be affected.

A second form of phase detector has been shown in FIGURE 4 and it is believed that the operation of this phase detector 126 will also be obvious to those skilled in the art. That is to say, when the input signal is in phase on one end of the circuit with the reference signal input and thus out of phase on the other end of the circuit, current flow around the closed loops will produce a greater D.C. voltage on one end of the circuit than on the other end and when the situation is reversed, the opposite will be true; this output can then be applied as heretofore described to the meter and to the AFC feed back loop.

It is obvious that there are many modifications that can be made to the individual circuits employed in this invention. It is also obvious that this invention is not restricted to radio circuits, but can also be employed in many other situations where saturating noise may create a signal-to-noise ratio of much less than unity, examples of such systems being: light transmission circuits where the light signal is buried in visual noise such as that produced by the sun, underwater communication systems where the signal may be buried in marine noise, and the like.

I claim:

1. Apparatus for indicating the presence of coherent energy located within a range of frequencies in the presence of saturating noise comprising in combination:

a source of coherent energy;

a reference oscillator for producing signals within a frequency range;

a phase detector having at least two input terminals and at least one output terminal, the said source of coherent energy being connected to one of the said input terminals and the reference oscillator being connected between the said output terminal and the other of said input terminals such that the phase detector produces an output signal that is representative of the instantaneous phase relationship of energy present at the input terminals and which output drives the reference oscillator such that it sweeps over the entire frequency range within which the said coherent energy is located; and, indicator means operatively connected to said phase detector for indicating any change in the rate of frequency shifting of said reference oscillator caused by the presence of coherent energy.

2. Apparatus for indicating the presence of coherent energy located within a range of frequencies in the presence of saturating noise comprising in combination:

a phase sensitive circuit having at least one input and an output;

means operatively connected to said input for supplying coherent energy thereto;

a wide-bandpass feedback loop connected between said output and said input of said phase sensitive circuit, said loop including an oscillator, means operatively connected between the output of said phase sensitive circuit and the input of said oscillator and responsive to the output of said phase sensitive circuit for sweeping the oscillator frequency over the entire frequency range within which said coherent energy is located, and means operatively connecting output signals from said oscillator to the input of said phase sensitive circuit; and means operatively connected to said phase sensitive circuit and responsive to any change in the average output thereof to indicate the presence of coherent energy at the input of said phase sensitive circuit.

3. Apparatus for indicating the presence of coherent energy within a range of frequencies when the said coherent energy is in the presence of saturating noise comprising:

a phase sensitive circuit having at least one input terminal and at least one output terminal;

means operatively connected to said input terminal for supplying coherent energy thereto;

a wide band-pass feedback loop connected between said output terminal and said input terminal of said phase sensitive circuit, said loop including an oscillator, means operatively connected between the output of said phase sensitive circuit and the input of said oscillator and responsive to the output of said phase sensitive circuit for sweeping the oscillator frequency over the entire frequency range within which said coherent energy is located, and means operatively connecting output signals from said oscillator to the input of said phase sensitive circuit; and means operatively connected to said feedback loop for monitoring frequency shifting of said oscillator to thereby produce an indication of the presence of coherent energy at the input to said phase sensitive circuit.

4. Apparatus for indicating the presence of coherent energy located within a range of frequencies in the presence of saturating noise comprising:

a phase detector having at least one input terminal and at least one output terminal;

means connected to said input terminal for supplying coherent energy thereto;

a wide band-pass automatic frequency control loop connected between the output and input terminals of said phase detector, said loop including in series an amplifier and a reference oscillator;

said loop being driven by said phase detector such that the reference oscillator provides an indication of coherent energy when such energy is present and is buried in saturating noise; and, means operatively connected to said loop for providing a measure of the presence of coherent energy.

5. Apparatus according to claim 4 wherein said measuring means is operatively connected to said reference oscillator.

6. Apparatus according to claim 4 wherein said series circuit includes means connected between said reference oscillator and said input of said phase detector and responsive to output signals from said reference oscillator for providing reference signals on the input of said phase detector.

7. Apparatus for indicating the presence of coherent energy located within a range of frequencies in the presence of saturating noise comprising:

a balanced phase detector having at least two input terminals and having at least one output terminal;

a source of coherent energy operatively connected to one of said input terminals of said phase detector for supplying coherent energy in the presence of saturating noise at said input terminal;

a wide band-pass feedback loop connected between said output terminal and the other of said input terminals of said phase detector, said loop including at least a reference oscillator, means connected between said output terminal of said phase detector and said reference oscillator for providing voltage variable frequency control to said oscillator, means connected to the output of said oscillator and responsive thereto for producing a control signal the duration of which is a function of the output of said oscillator, and means connected between said control signal means and the other of said input terminals of said phase detector for providing a variable frequency control signal to said second input terminal; and means connected to said loop for indicating the presence of coherent energy in the presence of saturating noise.

References Cited

UNITED STATES PATENTS 2,956,151 10/1960 Abelew _____ 325—364
3,205,453 9/1965 Fyler et al. _____ 328—133 XR WILLIAM C. COOPER, *Primary Examiner.*

R. S. BELL, *Assistant Examiner.*

U.S. Cl. X.R.

325—476; 328—133; 331—34